Patented Dec. 27, 1938

2,141,872

UNITED STATES PATENT OFFICE 2,141,872

COMPOUNDS OF THE PYRAZOLANTHRONE SERIES

Ralph N. Lulek, Milwaukee, and Earl E. Beard, South Milwaukee, Wis., assignors to E. I. du Pont de Nemours & Company, Wilmington, Del., a corporation of Delaware No Drawing. Application February 24, 1936, Serial No. 65,420

4 Claims. (Cl. 260—312)

This invention relates to the preparation of new compounds of the pyrazolanthrone series and more particularly to the preparation of 1,9-pyrazolanthrone-6-carboxylic acid and the acid chloride.

We have found that 1-amino-anthraquinone-6-carboxylic acid can be converted to a new and valuable dyestuff intermediate of the pyrazolanthrone series by diazotizing the amino group, reducing the diazo compound to the hydrazine and then ring-closing the 1-hydrazino-anthraquinone-6-carboxylic acid to the 1,9-pyrazolanthrone-6-carboxylic acid.

The diazotization and reduction of the diazo compound to the hydrazine may be carried out by the procedure generally employed for preparing anthraquinone hydrazine from 1-amino-anthraquinone. The 1-amino-anthraquinone-6-carboxylic acid used as the starting material may be obtained by reduction of the 1-nitro-anthraquinone-6-carboxylic acid of U. S. Patent 1,991,191, in alkaline solution with an alkali metal hydrosulfite or sulfhydrate.

The following example is given to more fully illustrate our invention. The parts used are by weight.

Example

Ten parts of 1-hydrazino-anthraquinone-6-carboxylic acid (obtained from 1-amino-anthraquinone-6-carboxylic acid) are heated in 70 parts of 95% sulfuric acid at 125–130° C. for from 4 to 5 hours. The reaction mass is then cooled and sufficient water is slowly added to reduce the sulfuric acid concentration to about 55%. The product is then filtered, washed acid free and dried. The new 1,9-pyrazolanthrone-6-carboxylic acid when in dry form is a greenish-yellow solid, very slightly soluble in nitrobenzene with a brownish-yellow color, and soluble in dilute caustic alkali with an orange to brown color. On fusing with alcoholic potash it gives a product which dyes cotton from a greenish-blue vat in strong yellow shades. The ring-closure of the 1-hydrazino-anthraquinone-6-carboxylic acid may be carried out in other acids, although sulfuric acid is preferred. The temperature and time may, of course, be varied within reasonable limits.

The 1,9-pyrazolanthrone-6-carboxylic acid may be converted to the 1,9-pyrazolanthrone-6-carbonyl chloride by heating with thionyl chloride in an inert organic solvent such as orthodichlorobenzene or nitrobenzene at 70–80° C.

We claim:

1. As a new compound, 1,9-pyrazolanthrone containing in the 6 position a group of the class consisting of —COOH and —COCl.

2. As a new compound, 1,9-pyrazolanthrone-6-carboxylic acid.

3. As a new compound, 1,9-pyrazolanthrone-6-carbonyl chloride.

4. The process for preparing 1,9-pyrazolanthrone-6-carboxylic acid which comprises heating 1-hydrazino-anthraquinone-6-carboxylic acid in acid solution to effect the formation of the pyrazole ring.

RALPH N. LULEK.
EARL E. BEARD.